Nov. 1, 1960
C. A. BEST, JR., ET AL
2,958,307
HORN WITH PLASTIC PROJECTOR
Filed March 29, 1956
2 Sheets-Sheet 1
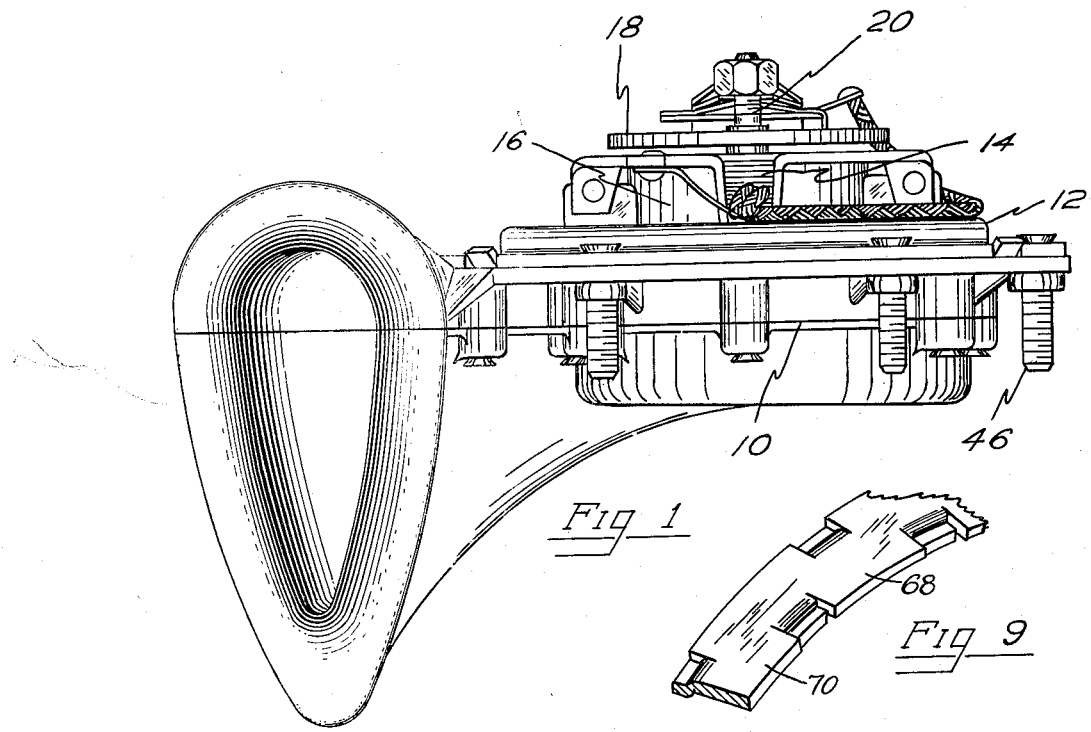
Fig. 1
Fig. 9
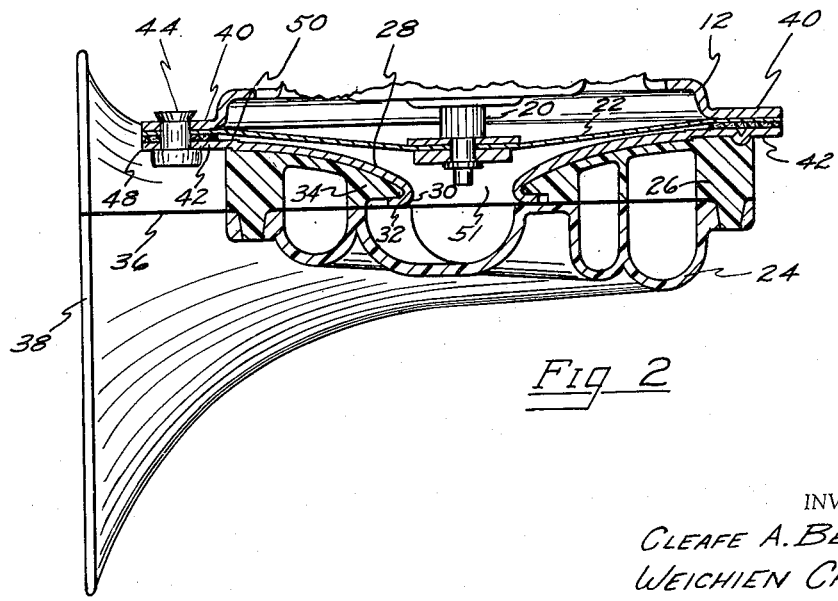
Fig. 2
INVENTOR
CLEAFE A. BEST, JR.
WEICHIEN CHOW
BY *[signature]*
ATTORNEY

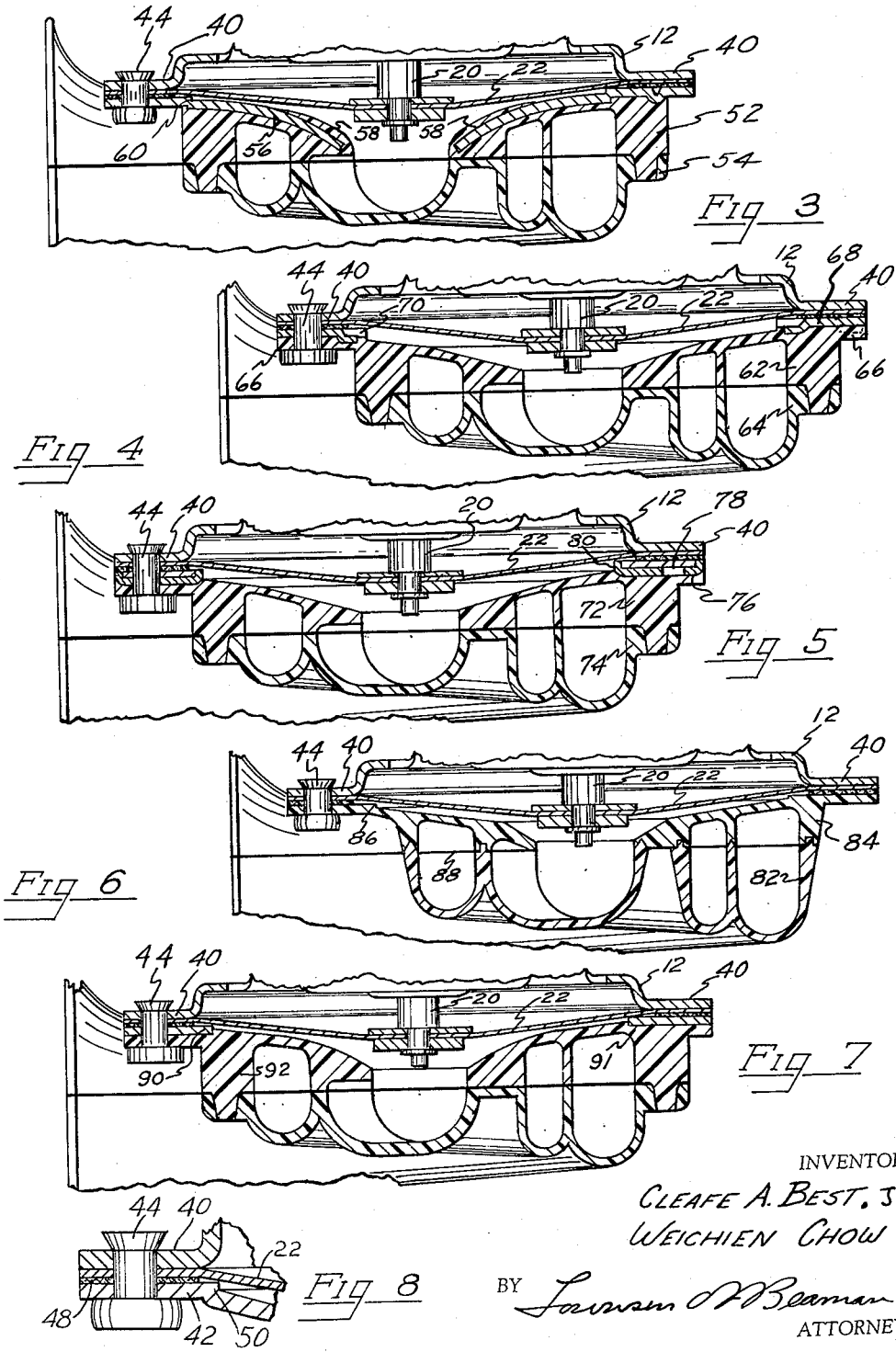

United States Patent Office 2,958,307
Patented Nov. 1, 1960

2,958,307

HORN WITH PLASTIC PROJECTOR

Cleafe A. Best, Jr., and Weichien Chow, Jackson, Mich., assignors to Sparks-Withington Company, Jackson, Mich., a corporation of Ohio Filed Mar. 29, 1956, Ser. No. 574,717

12 Claims. (Cl. 116—137)

The present invention relates to improvements in electric horns of the type being currently furnished in this country as standard equipment on practically all makes of automobiles. More particularly, the invention relates to a magnetic horn having an armature actuated diaphragm and a compact scroll type projector intimately disposed in relation to the diaphragm mounting frame structure.

As it is the practice at the present time to equip automobiles with two horns of the aforesaid type, the market for such horns on standard equipment exceeds 10,000,000 horns annually with the result that many horn manufacturers compete for this large volume and the market is highly competitive.

In the horns now being manufactured of the aforesaid type, it is the practice to fabricate the projector from a zinc die casting having a peripheral flange for the attachment of the die casting to the pressed steel housing constituting the main structural body of the horn. We propose a radical departure from such practice and which results in a substantial reduction in weight and materially reduces the cost of manufacture of the horn as compared with a die cast. To accomplish these results we have fabricated the projector from a plastic material, preferably one that is capable of injection type molding, as for example thermoplastic materials. While the concept of a plastic projector is not broadly new, prior proposals have not proven practical. However, we have overcome the structural and functional difficulties of such prior proposals through a novel association of plastic and steel parts in connection with the mounting of the projector and its peripheral association with the diaphragm of the horn.

Thus, an object of the invention is to provide an improved horn of the type described employing a novel integration of plastic and steel in the fabrication of the projector.

Another object is to provide a horn structure having a plastic projector with a metal peripheral portion presenting a rigid annular fulcrum for the diaphragm.

Another object is to provide a horn of the type described having a scroll projector defined by a pair of molded plastic parts and having a relatively rigid metal member defining, with the diaphragm, the compression chamber of the horn.

A further object is to provide a horn of the type described having a two part plastic molded projector and a perforated steel plate attached to one of the plastic parts for mounting the projector from adjacent the diaphragm mounting.

A still further object is to provide an improved horn having a magnetic actuated diaphragm and a plastic scroll projector having an annular metal unit presenting an annular fulcrum to the diaphragm adjacent its peripheral support.

A still further object of the invention is to provide a scroll type projector having a plastic outer part and an cast metal inner part, the latter presenting a rigid annular fulcrum to the diaphragm.

These and other objects and advantages residing in the construction, arrangement and combination of parts will more fully appear from the following specification and appended claims.

In the drawings in which several modifications are illustrated,

Fig. 1 is a side elevational view of a horn of the described type with the top casing removed, Fig. 2 is a fragmentary view shown in section taken on the center line of the diaphragm and showing one form of metal backing for the plastic projector, Fig. 3 is a view similar to Fig. 2 of another form of attachment of the metal backing with the plastic projector, Fig. 4 is a view similar to Fig. 2 of a plastic projector having a peripheral metal insert, Fig. 5 is a view similar to Fig. 2 of another form of metal insert, Fig. 6 is a view similar to Fig. 2 of a further modification in which the projector has another plastic part and an inner die cast part, Fig. 7 is a view similar to Fig. 2 of a still further modification in which the projector is of plastic and a separate annular member provides the rigid fulcrum for the diaphragm, and Fig. 8 is an enlarged detail showing the relation between the diaphragm and the back plate of Fig. 2.

Fig. 9 is a fragmentary perspective view of the metal insert of the form of Fig. 3.

Referring to the form of the invention shown in Figs. 1, 2 and 8, the horn 10 has a main body housing 12 of pressed sheet metal in which the field coil 14 is supported within the cup portion 16. The armature 18 carries the shaft 20 which is attached at its lower end to the metal diaphragm 22, for example, as shown in U.S. Patent No. 2,158,209, all of which is well known in the art and may follow prior practices.

According to the present invention the scroll projector of the horn 10, in lieu of being a two part zinc die casting, comprises an integrated sheet metal and plastic structure in the form of an outer plastic molded part 24, an inner complementary and mating plastic molded part 26 and a relatively rigid sheet metal plate 28. The plate 28 is centrally perforated at 30 with the inner peripheral edge 32 formed into embracing relation with the annular shoulder 34 by a spinning operation or in some other suitable manner. The parts 24 and 26 are preferably joined along the parting line 36 by a suitable bonding or solvent adhesive, such as trichlorethylene. In practice the parts 24 and 26 may be formed in injection molding presses from any one of a great many thermoplastic materials such as cellulose acetate, acrylics, vinyls, polystyrene, polyethylene, fluorocarbons, copolymers and nylons. It will be understood that the bell 38 of the projector is formed by integral portions of the parts 24 and 26.

The connection between the shoulder 34 of the part 26 and the plate 28 is such that the two part plastic projector is rigidly supported to the housing 12 by the clamping together of the peripheral flange 40 of housing 12 and the peripheral portion 42 of the plate 28 by the rivets 44 and upset mounting studs 46. A thin fiber gasket 48 is shown located between the flange 40 and portion 42. To provide the necessary rigid fulcrum over which the diaphragm 22 vibrates, the plate 28 is provided with an annular shoulder 70, more clearly shown in Fig. 9, which presents a rigid support to the diaphragm 22 inwardly of the peripheral edge of the diaphragm 22 located between flange 40 and portion 42.

In the modification of Fig. 3, the plastic parts 52 and 54 define the projector of the horn and correspond to parts 24 and 26 of Fig. 1. The plate 56, corresponding to the plate 28 is shown imbedded in a portion 58 of the part 52. This can be accomplished in several ways one of which is to insert the plate 56 into the injection molding press at the time the part 52 is molded. Another method is to mold the portion 58 as a cylindrical central hub of part 52 and then heat and form the same into the interlocking position with the plate 56, as shown. The annular fulcrum for the diaphragm 22 is shown at 60.

Referring to Fig. 4, the plastic parts 62 and 64 constitute the projector of the horn with the peripheral portion 66 of the part 62 being reinforced and made rigid by a narrow metal ring 68 molded as an insert. Preferably, the inner and outer edges of the ring 68 are formed as shown in Fig. 9 so as to interlock the ring 68 in the plastic body of the part 62. Thus, the annular fulcrum 70 for the diaphragm 22 will be defined by alternating ledge portions of metal and plastic.

Fig. 5 shows a form similar to Fig. 4 in that the plastic projector defined by the parts 72 and 74 are likewise reinforced by a narrow metal ring 76 corresponding to the ring 68 but of channel cross-section and provided with circumferentially spaced holes 78 through which plastic material flows upon molding of the part 72 to interlock the ring 76 in the part 72. The inner flange 80 of the ring 76 defines the rigid annular fulcrum for the diaphragm 22.

In Fig. 6 is shown a projector in which, in lieu of a metal insert to provide the rigid fulcrum for the diaphragm 22, only the part 82 is plastic while the part 84 is a metal die casting having an integral annular fulcrum 86. The parts 82 and 84 may be bonded along the parting line 88 by a suitable adhesive.

The form of the invention in Fig. 7 differs from the disclosure of Figs. 4 and 5 in that the narrow reinforcing metal ring 90 is not imbedded or interlocked in any way with the plastic part 92 of the plastic projector. Ring 90 at the time of assembly is merely inserted as a separate washer with its inner edge 91 defining the fulcrum on which the diaphragm 22 is given rigid support.

We claim:

1. In a horn of the type described, a diaphragm, a rigid metal housing having a peripheral flange portion for said diaphragm, a rigid metal plate having a peripheral clamping portion for said diaphragm and a portion defining an annular fulcrum for the diaphragm being adjacent said mounting portion, said diaphragm disposed between said mounting portion and said clamping portion, and a scroll projector having inner and outer parts disposed to one side of said diaphragm in spaced relation thereto and defining a resonator chamber therewith, said metal plate being located between said mounting portion and that portion of said projector defining said resonator chamber, said outer part being of light weight non-metallic material.

2. In a horn as defined in claim 1 wherein both of said inner and outer parts are of similar material.

3. In a horn as defined in claim 2 wherein said metal plate is located between said flange portion and said projector.

4. In a horn as defined in claim 1 wherein said metal plate and said inner part are interlocked.

5. In a horn as defined in claim 4 wherein said metal plate is the sole supporting structure for attaching said projector to said housing.

6. In a horn of the type described, a diaphragm, a rigid metal housing having a peripheral flange portion for said diaphragm, a rigid metal plate, said diaphragm being disposed between said flange portion and said rigid metal plate, and a scroll projector having inner and outer parts disposed to one side of said diaphragm in spaced relation thereto and defining a resonator chamber therewith, said rigid metal plate being located between said flange portion and that portion of said projector defining said resonator chamber, said outer part being of light weight non-metallic material.

7. In a horn as defined in claim 6 wherein said outer part is of thermoplastic material.

8. In a horn as defined in claim 6 wherein said inner and outer parts are of similar material.

9. In a horn of the type described, a diaphragm, a rigid metal housing having a peripheral flange portion for said diaphragm, a rigid metal plate disposed on the opposite side of the diaphragm from said flange portion and giving peripheral support to the diaphragm, said diaphragm having its peripheral portion located between said rigid metal plate and said flange portion, and a non-metallic scroll projector located in opposed relation to said diaphragm and having peripheral support with said housing, and means for rigidly and peripherally securing said housing, diaphragm, rigid metal plate and projector.

10. In a horn as defined in claim 9 wherein said projector is of the thermoplastic material.

11. In a horn as defined in claim 9 wherein said metal plate is interlocked with said projector.

12. In a horn as defined in claim 10 wherein said metal plate is interlocked in the material of said projector.

References Cited in the file of this patent

UNITED STATES PATENTS

| | | |
|---|---|---|
| 1,604,274 | Gammeter | Oct. 26, 1926 |
| 1,605,854 | Putt | Nov. 2, 1926 |
| 2,041,925 | Heath | May 26, 1936 |
| 2,158,209 | Von Voigtlander | May 16, 1939 |